US007711025B2

(12) United States Patent
Schmitz et al.

(10) Patent No.: US 7,711,025 B2
(45) Date of Patent: May 4, 2010

(54) LASER AMPLIFIER

(75) Inventors: Christian Schmitz, Dunningen (DE); Andreas Voss, Stuttgart (DE)

(73) Assignee: TRUMPF LASER GmbH + Co. KG, Schramberg (DE)

( * ) Notice: Subject to any disclaimer, the term of this patent is extended or adjusted under 35 U.S.C. 154(b) by 388 days.

(21) Appl. No.: 11/295,731

(22) Filed: Dec. 6, 2005

(65) Prior Publication Data

US 2006/0140241 A1    Jun. 29, 2006

(30) Foreign Application Priority Data

Dec. 23, 2004   (EP) ................. 04030553

(51) Int. Cl.
*H01S 3/081*    (2006.01)
(52) U.S. Cl. .............. 372/93; 372/70; 372/72; 372/98; 372/101
(58) Field of Classification Search ............. 372/69–72, 372/75, 92, 93, 98, 101
See application file for complete search history.

(56) References Cited

U.S. PATENT DOCUMENTS

| | | | | |
|---|---|---|---|---|
| 5,386,426 A | * | 1/1995 | Stephens | 372/20 |
| 5,864,430 A | * | 1/1999 | Dickey et al. | 359/559 |
| 5,926,494 A | * | 7/1999 | Pepper | 372/70 |
| 5,953,354 A | * | 9/1999 | Staver et al. | 372/18 |
| 2001/0038658 A1 | | 11/2001 | Contag et al. | |
| 2002/0075934 A1 | | 6/2002 | Ludewigt et al. | |
| 2004/0095975 A1 | | 5/2004 | Bruesselbach et al. | |

FOREIGN PATENT DOCUMENTS

| WO | WO 87/05160 | 8/1987 |
|---|---|---|
| WO | WO 00/25394 | 5/2000 |

OTHER PUBLICATIONS

Scott et al., "Efficient high-gain laser amplification from a low-gain amplifier by use of self-imaging multipass geometry", Applied Optics, Optical Society of America, Washington, US, Bd. 40, Nr. 15, May 20, 2001, pp. 2461-2467.

* cited by examiner

*Primary Examiner*—Minsun Harvey
*Assistant Examiner*—Xnning Niu
(74) *Attorney, Agent, or Firm*—Fish & Richardson P.C.

(57) ABSTRACT

In a solid-state laser amplifier including at least two laser-active media in a common laser radiation field, the laser-active media do not form a hard aperture for the laser radiation field. Each of the laser-active media define a plane that is penetrated by the laser radiation field. The laser amplifier includes at least one focusing optical element disposed in the laser radiation field between two adjacent laser-active media. A focal length and a distance of the focusing optical element from the planes of the two adjacent laser-active media are selected such that the planes of the laser-active media are approximately mapped onto each other by a near-field far-field transformation.

20 Claims, 4 Drawing Sheets

LASER AMPLIFIER

CROSS REFERENCE TO RELATED APPLICATION

This application claims priority under 35 U.S.C. §119(a) to European Patent Application No. 04 030 553.4, filed Dec. 23, 2004, the entire contents of which are hereby incorporated by reference.

TECHNICAL FIELD

The application relates to a solid-state laser and a solid-state laser amplifier.

BACKGROUND

DE 198 35 108 A1 describes a solid-state laser in which several disk laser crystals are disposed in a common resonator. The laser radiation field penetrates the laser crystals. The resonator includes two end mirrors and additional deflecting mirrors (plane mirrors) disposed between the disk laser crystals to form the laser radiation field.

A resonator for a high-performance solid-state laser is designed to achieve a high resonator stability and constant radiation properties with varying operating parameters. In contrast to conventional high-performance rod lasers, in a high-performance disk laser, the thermally induced spherical wavefront deformation of the resonator radiation field ("thermal lens") during passage of the laser radiation through the laser-active medium is not the dominating factor for the stability of the resonator when a sufficiently rigid heat sink or a transparent support body is used to stabilize the laser-active medium mounted thereon. A high-performance disk laser can therefore be designed in such a manner that, within the entire pump capacity range, the resonator remains far away from the critical points or limits of the dynamic stability range as described by the stability diagram (g-diagram). This also applies if a resonator includes several laser-active media (disk laser crystals).

Two other effects have a substantially larger influence on the properties of the laser radiation field of a disk laser or a disk laser amplifier. On the one hand, a static wavefront deformation is produced during passage of the laser radiation field through a laser-active medium, and on the other hand, there may arise thermally induced diffraction losses.

The static wavefront deformation of the laser radiation field is due to a deviation of the laser-active medium from its ideal form, and this deviation results mainly from production tolerances. The static wavefront deformation is made of a spherical portion resulting from the deviation of the laser-active medium from the desired radius and an irregular (aspherical) portion. The spherical portion results from the difference between desired and actual refractive power of the laser-active medium and is also called (static) refractive error. The static refractive error adds to the dynamic thermal lens that is present also in high-performance disk lasers, and in some cases, the static refractive error may even exceed the dynamic thermal lens. The refractive errors of several crystals in a disk laser should be taken into consideration in the design of the laser amplifier or resonator. Typically, a laser amplifier should have laser radiation fields of the same diameter on the different crystals, assuming identical refractive power of the crystals. Different refractive powers of the crystals lead to more or less varying beam diameters on the crystals and such variation causes the following problems. The outer regions of the laser radiation field are not amplified on crystals with enlarged beam diameter but are partially absorbed. In contrast thereto, the power available in the outer region of the pump spot of crystals having a reduced beam diameter is not retrieved. Under unfavorable conditions, this can cause local overheating and ultimately destruction of the crystal. In any case, the laser efficiency is reduced.

The thermally induced diffraction losses in the disk laser amplifier are partially due to wavefront deformation of the laser radiation field during passage through the thermally loaded laser-active medium. In the disk laser, the wavefront deformation dominates in the edge region of the pump spot, that is, in the transition region between the hot, pumped crystal region and the cool, non-pumped outer region. The thermally induced diffraction losses in the disk laser amplifier may be due to inhomogeneities of the pump light distribution and distortions of the laser radiation field due to fluctuating regions of different thermal load in the laser-active medium. Moreover, because the wavefront is deformed, the energy in the resonator is redistributed between the resonator modes, causing energy transfer to "leak modes" that are not sufficiently amplified in the amplifier. The disk laser is particularly sensitive to such losses due to its low amplification. The losses thereby depend on the design of the laser and, in particular, on the required beam quality of the laser output radiation. If there is insufficient blocking of diffracted beam parts between the amplifier stages, the thermally induced diffraction effects in the disk laser or amplifier result in steadily increasing deterioration of the beam quality. Subsequent improvement of the beam quality through hard apertures may result in considerable performance or efficiency loss.

The larger the requirements for the beam quality of a disk laser or amplifier are, the larger is the influence of diffraction effects on the efficiency. Additionally, dynamic and static refractive errors have a greater influence on the efficiency as the requirements for the beam quality of the disk laser or amplifier increase. The dynamic stability range, that is, the admissible refractive power range of the laser-active media, is reduced as the pump spot diameter is increased and as the required beam quality is increased.

The influence of the static refractive error and of the thermally induced diffraction losses increases with the number of passages of the laser radiation field through a laser-active medium during a resonator circulation or within an amplifier chain. The effect of the number of passages depends substantially on the design of the amplifier.

The static refractive errors and thermally-induced diffraction losses also influence the efficiency and the resonator stability of high-performance rod lasers with several rods in a laser resonator. This influence can be noticed in particular if the beam quality must be high, for large beam cross-sections, low amplification per passage through a laser crystal, and in the absence of hard apertures (for example, rod surfaces). For dynamically stable rod laser systems with strong thermal lens and high amplification (for example, Nd:YAG or Nd:YVO$_4$ at 1064 nm), the beam quality is limited by the thermal lens and the diffraction losses are typically dominated by the hard apertures such that the thermally induced diffraction losses play a minor role. Only for rod laser systems with a limited dynamic stability range (that is, almost constant pumping power) and no hard apertures and preferably for laser-active media with low amplification (for example, Yb:YAG), the thermally induced diffraction losses can have a substantial influence on the efficiency.

One characteristic property of a disk laser is the absence of hard apertures directly bordering the active volume. The use of hard apertures to determine the beam parameter product in a disk laser is not required and generally not useful, since diffraction losses at the apertures would considerably reduce the efficiency of the disk laser, the apertures would have to be exactly centered, their diameters would have to be precisely adjusted to the resonator modes and they would also have to be cooled at least for high laser powers. The non-pumped outer region of the disk laser crystal of quasi-three-level laser systems absorbs laser radiation and thus forms a "soft" amplification/loss stop (or gain aperture) in connection with the pumped part. Ytterbium-doped laser material (Yb:YAG, etc.) is a common material used in disk lasers, and forms a quasi-three-level laser system. In the pumped inner region of the laser crystal, the laser radiation is amplified and in the non-pumped outer region, the laser radiation is absorbed. This "soft" aperture simultaneously strongly reduces diffraction losses. The position of the amplification/loss apertures in the resonator is predetermined by the axial position of the laser crystals.

In the case of rod lasers, hard apertures in the laser radiation field can be avoided by ensuring that the rod surfaces do not act as apertures. For example, rods that are only axially pumped in one central partial volume do not act as hard apertures in the laser radiation field. As another example, bonded rods do not contribute hard apertures in the laser radiation field because bonded rods have a passive (that is, a transparent or slightly absorbing) volume that is adapted to the refractive index and disposed concentrically around the active volume. In both cases, the rods produce a "soft" amplification/loss aperture in the transition between the pumped and non-pumped crystal volume similar to the disk laser crystal.

SUMMARY

In one general aspect, a laser amplifier includes laser-active media that do not form hard apertures for the laser radiation field. That is, the laser-active media do not contribute apertures with sharp edges that significantly cut or limit the designed beam cross-section. In this way, the influence of the static wavefront deformation (that is, the static refractive error) and, in particular, the influence of the thermally induced diffraction losses on the efficiency of the amplifier and the resulting beam quality can be minimized without introducing hard apertures into the laser radiation field.

The laser resonant amplifier includes at least one focusing optical element disposed in the laser radiation field between two adjacent laser-active media. A focal length and a distance of the focusing optical element from the planes of the two adjacent laser-active media are selected in such a manner that the planes of the laser-active media can be mapped into one another by a near-field far-field transformation (such as a Fourier transformation).

The plane of the laser-active media can be on a side surface of the laser-active media. The plane of the laser-active media can be at least one of the principal planes of the laser-active media.

The near-field far-field transformation between the coupled laser-active media filters the thermally induced diffraction portions of the laser radiation field without the use of hard apertures. Two non-equivalent planes in the laser beam formed by the surfaces of disk laser crystals or the principal planes of laser rods are filtered by the amplification/loss apertures of the pumped region of the laser crystals. The two planes are optically coupled, that is, one plane represents the far field of the other and vice versa. Since the optical path length of the laser beam to be amplified within a laser rod is not negligibly short in contrast to the disk laser crystal, the near-field far-field transformation with coupled laser rods can be exactly performed only for selected points within the rods. For this reason, the near fields and far fields associated to one another are disposed in the principal planes of the rods.

In one implementation, the focusing optical element for the near-field far-field transformation is a lens having a positive focal length and being disposed approximately at a distance equivalent to its focal length from the surfaces of two disk laser crystals or from the adjacent principal planes of two laser rods. The lens generates a diffraction image for each diffracted beam portion emerging from the first crystal in its focal plane at a distance from the beam axis that is proportional to the respective diffraction angle. The second coupled disk laser crystal or a principal plane of the second coupled laser rod is located in the focal plane. At the "soft" amplification/loss aperture of the second coupled crystal, the radiation portions with an excessively large diffraction angle, that is, a diffraction angle that is not compatible with the required beam quality, are filtered out. In reverse order of the laser crystals, the lens shows an analogous effect.

In a further implementation, the focusing optical element for the near-field far-field transformation is a spherical concave mirror that is disposed approximately at a distance equivalent to half its curvature radius from the surfaces of two disk laser crystals or from the adjacent principal planes of two laser rods. The two laser crystals or their adjacent principal planes are therefore disposed approximately in the focal plane of the mirror. This configuration is advantageous compared to the use of a lens as a focusing element in that the concave mirror is not penetrated by the laser radiation field, thereby preventing thermal disturbances in the focusing element. Minimum loss on the focusing optics is achieved if the preferably dielectrically highly-reflective mirror coating has a suitable design. In an alternative implementation, a paraboloidal or toroidal mirror can be used as the focusing element instead of the spherical concave mirror.

Furthermore, the influence of the static refractive error can be reduced with a configuration in which at least one additional focusing optical element is introduced between (each) two laser crystals disposed adjacent to each other in the resonator or the amplifier chain, thus producing an image of the crystals or the crystal principal planes and therefore an image of the pumped partial regions (pump spots) and of the laser radiation field on the crystals or in the crystal principal planes. The image determines the ratio between the diameters of the laser radiation field on the two crystals or crystal principal planes irrespective of their refractive powers merely by the magnification.

The additional focusing optical element can be designed and disposed in the laser radiation field in such a manner that the surfaces of two disk laser crystals or the adjacent principal planes of two laser rods are mapped on each other at a scale of 1:1. In 1:1 images, the diameters of the laser radiation field on both disk laser crystals or in the adjacent principal planes of the laser rods are the same irrespective of possible refractive power differences. Such a magnification is useful if both laser crystals are pumped by an identical pump radiation configuration having the same pump spot diameters. The image causes the two laser crystals to act as one single laser crystal having a refractive power that corresponds to the sum of the individual refractive powers.

In one implementation, the additional focusing optical element for the imaging includes a lens having a positive focal length and being disposed at a distance equivalent to approximately two times the focal length from the surfaces of two disk laser crystals or from adjacent principal planes of two laser rods. Such a configuration produces a 1:1 image of the disk laser crystals or the principal planes on one another.

In another implementation, the additional focusing optical element includes a spherical concave mirror that is disposed at a distance equivalent to approximately its radius from the surfaces of two disk laser crystals or from the adjacent principal planes of two laser rods. This configuration is advantageous compared to the one that uses a lens as imaging element in that the concave mirror in this configuration is not penetrated by the laser radiation field, thereby preventing thermal disturbances in the optical element and minimizing losses due to a suitable highly-reflective mirror coating.

In another implementation, a paraboloidal or toroidal mirror can be used as the focusing optical element instead of the spherical concave mirror.

In another implementation, the additional focusing optical element includes a telescopic configuration of two preferably identical concave mirrors or lenses. The imaging by one single mirror or one single lens produces excessive refractive power of the unit of two laser crystals and the imaging element, whose amount is inversely proportional to the focal length of the lens or radius of the mirror. To minimize this excessive refractive power, the focal length of the lens or the radius of the mirror should be relatively large. However, this disadvantage can be avoided by using a telescope that consists of two concave mirrors having the same radius or two lenses having the same focal length. The mirrors are thereby each disposed at a distance equivalent to half the radius of the mirrors from one of the two laser crystals, and the lenses are disposed analogously at a distance equivalent to the focal length of the lenses. Because the distance between the two mirrors equals the radius of the mirrors and the lens distance equals double the focal length, an image can be produced without excessive refractive power.

A positive and also a negative excessive refractive power can be specifically generated through variation of the mirror or lens distance, which permits for example, compensation of tolerances in the total refractive power of the two laser crystals imaged onto each other.

If more than two laser-active media are disposed in a laser resonator or an amplifier chain, the image of two crystal surfaces or principal planes onto each other and also the near-field far-field transformation can advantageously be used to influence the laser radiation field, but generally not on the same laser crystal pair. However, it is also possible that the radiation field in the resonator or amplifier passes the same laser crystals several times, for example, by introducing deflecting mirrors into the beam path. In an implementation of this type, a combination of imaging and near-field far-field transformation on the same laser crystal pair is possible.

In another general aspect, the disk laser or amplifier includes at least two pairs of disk laser crystals disposed in the radiation field. The surfaces of the disk laser crystals of each pair are imaged onto each other by a first focusing optical element, and a second focusing optical element is disposed in the laser radiation field between the pairs. The second focusing optical element maps the surface of a disk laser crystal of one pair onto the surface of a disk laser crystal of the other pair through a near-field far-field transformation. This configuration compensates for refractive errors of the individual laser crystal and also filters out undesired thermally induced diffracted portions of the laser radiation field. A disk laser of this design has a large stability range with constant radiation properties without the need of introducing additional hard apertures into the laser radiation field.

In another general aspect, a method of forming a laser amplifier includes focusing pump radiation onto a first plane defined by a first laser-active medium, focusing pump radiation onto a second plane defined by a second laser-active medium, and focusing light between the first and second planes with an optical element in a laser radiation field extending between the first and second laser-active media. A focal length of the optical element is selected and the optical element is separated from the first and second planes such that the first and second planes of the laser-active media are approximately mapped into one another by a near-field far-field transformation.

Implementations can include one or more of the following features. For example, the method may include imaging the first and second planes onto each other with another optical element. The first and second planes may be imaged onto each other at a scale of one to one. The first and second planes may be mapped onto each other through a Fourier transformation.

In another general aspect, a solid-state laser includes at least two laser-active media in a common laser radiation field, and at least one focusing optical element. The laser-active media do not form a hard aperture for the laser radiation field and the laser-active media each define a plane that receives the laser radiation field. The at least one focusing optical element is disposed in the laser radiation field between two of the at least two adjacent laser-active media. A focal length and a separation of the focusing optical element from the planes of the two adjacent laser-active media are each selected such that the planes of the laser-active media can be mapped into one another by a near-field far-field transformation.

Implementations can include one or more of the following features. The laser can include a resonator that feeds output from the laser-active media back into the laser-active media.

Further advantages can be extracted from the description and the drawings. The features mentioned above and below may be used individually or collectively in arbitrary combination. The implementations shown and described are not to be understood as exhaustive enumeration but have exemplary character. Other features will be apparent from the description, the drawings, and the claims.

DESCRIPTION OF DRAWINGS

Like reference symbols in the various drawings may indicate like elements.

DETAILED DESCRIPTION

Figure 1:
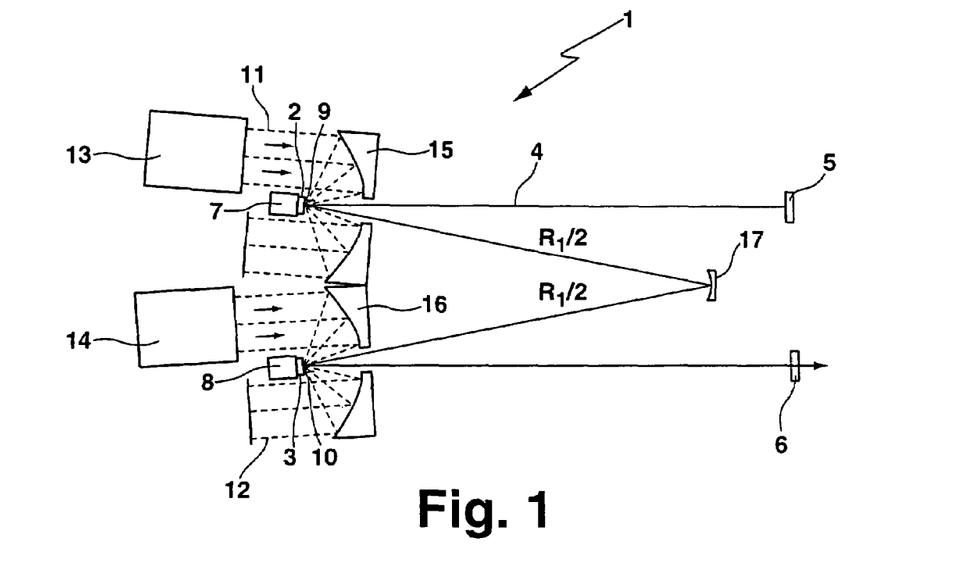
FIG. 1 shows a schematic view of a first implementation of a laser having two disk laser crystals and a spherical concave mirror as a focusing optical element for the near-field far-field transformation.

Referring to FIG. 1, a solid-state laser 1 includes a first disk laser crystal 2 and a second disk laser crystal 3 that act as laser-active media in a common laser radiation field 4 formed between an end mirror 5 and a output mirror 6. The two disk laser crystals 2, 3 have an identical construction as have the devices for pumping and cooling thereof described below.

The disk laser crystals 2, 3 are formed as disks having two flat sides or surfaces. The lower flat sides of the disk laser crystals 2, 3 are mounted to respective heat sinks 7, 8. Two pump radiation fields 11, 12 shown in dashed lines impinge on the upper flat sides or surfaces 9, 10 of, respectively, the disk laser crystals 2, 3. The pump radiation fields 11, 12 are generated by two pump modules 13, 14 that are part of a pump configuration (not shown) for generating pump radiation. The pump radiation fields 11, 12 are focused by parabolic mirror configurations 15, 16 as pump spots onto the surfaces 9, 10 of the disk laser crystals 2, 3, respectively. The parabolic mirror configurations 15, 16 each have a central opening through which the laser radiation field 4 can reach the disk laser crystals 2, 3 and penetrate into their laser-active solid-state volume. The openings are sufficiently large to ensure that the configurations 15, 16 do not act as apertures for the laser radiation field 4. The lower flat sides of the disk laser crystals 2, 3 are coated to be reflective to both pump radiation and laser radiation.

A spherical concave mirror 17 is disposed in the laser radiation field 4 between the first disk laser crystal 2 and the second disk laser crystal 3 approximately at a distance equivalent to half its radius $R_1$ from the surface 9 of the first disk laser crystal 2 and from the surface 10 of the second disk laser crystal 3. The spherical concave mirror 17 is positioned such that the surface 10 of the disk laser crystal 3 and the surface 9 of the disk laser crystal 2 are mapped onto each other through a near-field far-field transformation (such as a Fourier transformation). The edge regions of the pump spots on the surfaces 9 and 10 act as soft apertures for the laser radiation field 4.

Figure 2:
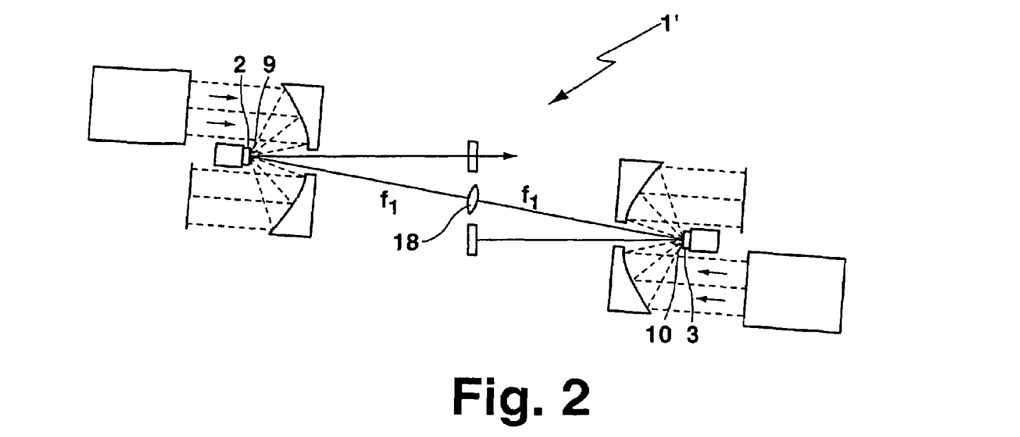
FIG. 2 shows a schematic view of a second implementation of a laser having two disk laser crystals and a convergent lens as a focusing optical element for the near-field far-field transformation.

Referring to FIG. 2, a laser 1' includes two disk laser crystals 2, 3. The crystals have surfaces 9, 10 that are coupled by a focal length $f_1$ through a convergent lens 18. The convergent lens 18 is disposed at a distance equivalent to its focal length $f_1$ from the first surface 9 and from the second surface 10. The lens 18 is positioned such that the surface 10 of the disk laser crystal 3 and the surface 9 of the disk laser crystal 2 are mapped to one another through a near-field far-field transformation (such as a Fourier transformation), and such that the edge regions of the pump spots on the surfaces 9 and 10 of the laser crystals 2 and 3 act as soft apertures for the laser radiation field 4. Apart from these features, the construction of the laser 1' corresponds to the laser 1 of FIG. 1.

Figure 3:
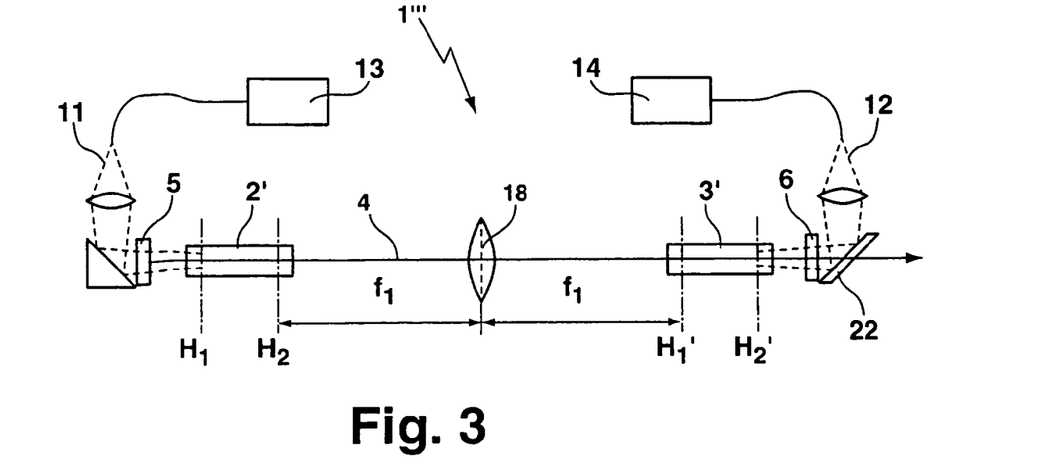
FIG. 3 shows a schematic view of a third implementation of a laser having two laser rods and one convergent lens as a focusing optical element for the near-field far-field transformation.

Referring to FIG. 3, a laser 1''' includes two rod-shaped laser crystals 2', 3' in the laser radiation field 4. The two rod-shaped laser crystals 2', 3' are coupled through a near-field far-field transformation. The laser crystals 2', 3' each have a first principal plane $H_1$, $H_1'$ and a second principal plane $H_2$, $H_2'$. The laser crystals 2', 3' are pumped in an axial direction only in a central partial volume. The laser crystals 2', 3' are made of a material having low amplification, such as, for example, Yb:YAG. In the example shown, the occurrence of hard apertures in the laser-active medium is prevented by pumping a central axial partial region using (fiber-coupled) laser diodes as pump modules 13, 14. The pump light radiation 11, 12 is irradiated axially into the rod-shaped laser crystals 2', 3' using two dichroic resonator mirrors as end mirror 5 or output mirror 6 and a further external dichroic dividing mirror 22 that separates the emerging laser radiation from the pump light.

To optimize the function of the near-field far-field transformation, the dynamic range of the thermal lenses should not extend to the limit of the stable range in the g-diagram in case of varying operating conditions of the laser 1'''. The rod laser can be operated with almost constant pumping power to reduce the influence of the thermal lens and obtain high beam quality. Compensation of thermally induced birefringence, for example, through a centrally disposed 90° rotator, may be additionally required. Filtering in the near and far fields using soft apertures has a significant effect on the laser efficiency only if the beam cross-section is large and the beam quality is high. A lens 18 having a positive focal length f, is disposed between the rod-shaped laser crystals 2', 3', whose distance from the adjacent principal planes $H_2$ and $H_1'$ of the two laser rods corresponds each approximately to its focal length $f_1$. The far field associated with the principal plane $H_2$ of the left rod is therefore located at a distance equivalent to the focal length f, to the right of the lens, where the principal plane $H_1'$ of the right rod is provided. The near-field far-field transformation applies approximately in an axial region of the laser rods in which the Fresnel number $F=a^2/(\lambda \cdot L)$ is considerably larger than one (F>>1), where a is the transverse extension of the diffracting structure; $\lambda$ is the wavelength of the laser radiation; and L is the axial distance from the exact transformation plane. If the diffracting structures are sufficiently large and the laser rod is not too long, the near-field far-field transformation considerably reduces the diffraction losses.

Figure 4:
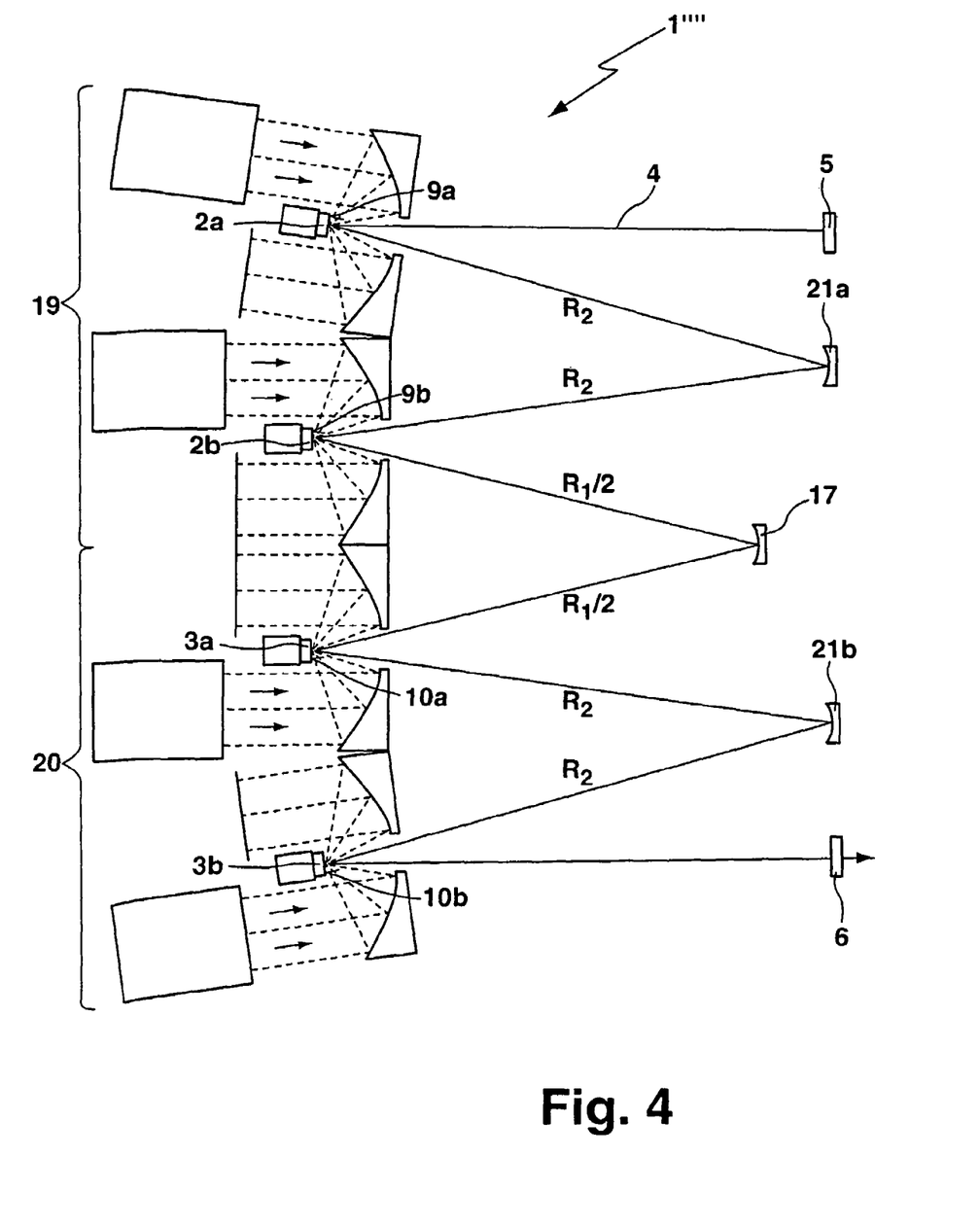
FIG. 4 shows a schematic view of a fourth implementation of a laser having two pairs of disk laser crystals and spherical concave mirrors as focusing optical elements for the near-field far-field transformation and for the imaging.

Referring to FIG. 4, a laser 1'''' includes a first pair 19 of disk laser crystals 2a, 2b and a second pair 20 of disk laser crystals 3a, 3b. The surfaces 9a, 9b of the two disk laser crystals 2a, 2b of the first pair 19 are imaged onto each other by a spherical concave mirror 21a that serves as an optical imaging element at a scale of 1:1 and is disposed at a distance equivalent to its radius $R_2$ from the surfaces 9a, 9b of the disk laser crystals 2a, 2b. In an analogous manner, the surfaces 10a, 10b of the two disk laser crystals 3a, 3b of the second pair 20 are imaged onto each other by the spherical concave mirror 21b. A concave mirror 17 is disposed between the surface 9b of the disk laser crystal 2b of the first pair 19 and the surface 10a of the disk laser crystal 3a of the second pair 20 at a distance equivalent to half its radius $R_1$. The spherical concave mirror 17 couples the two pairs 19, 20 in such a manner that a laser radiation field 4 is generated that is common to both pairs 19, 20. The spherical mirror 17 ensures that the surface 9b of the disk laser crystal 2b of the first pair 19 and the surface 10a of the disk laser crystal 3a of the second pair 20 are mapped onto each other by a near-field far-field transformation (for example, a Fourier transformation). The edge regions of the pump spots on the surfaces 9b and 10a act as soft apertures for the laser radiation field 4. The laser configurations shown in FIGS. 1-4 could also be implemented as part of a laser amplifier. In this case, the mirrors and 6 would be omitted.

Figure 5:
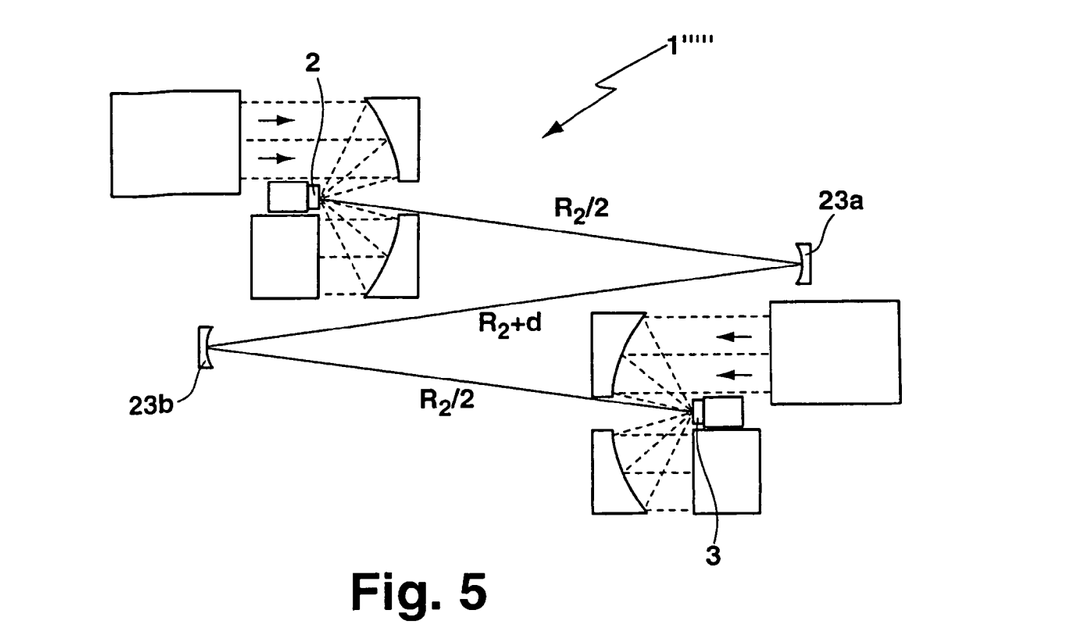
FIG. 5 shows a schematic view of a detail of a fifth implementation of a laser or a laser amplifier having two disk laser crystals and a telescope of two spherical concave mirrors as focusing optical elements for imaging the laser crystals onto each other.

Referring to FIG. 5, a laser amplifier or a section of a laser 1''''' includes, between two disk laser crystals 2, 3, a telescope of two spherical concave mirrors 23a, 23b that act a as focusing optical element for imaging the laser crystals onto each other. The concave mirrors 23a, 23b have the same radius of curvature $R_2$ and are disposed approximately at a distance equivalent to half their radius $R_2$, from the respectively adjacent laser crystal 2, 3. To obtain an image without excessive refractive power, the distance between the two concave mirrors 23a, 23b is equal to the mirror radius $R_2$. A positive (d>0) and also a negative (d<0) excessive refractive power can be specifically generated through changing the separation between the concave mirrors 23a, 23b from $R_2$ to $R_2$+d. The configuration shown in FIG. 5 could also be implemented as a laser. In this case, the appropriate optical elements (such as the mirrors 5 and 6) would be added.

Figure 6:
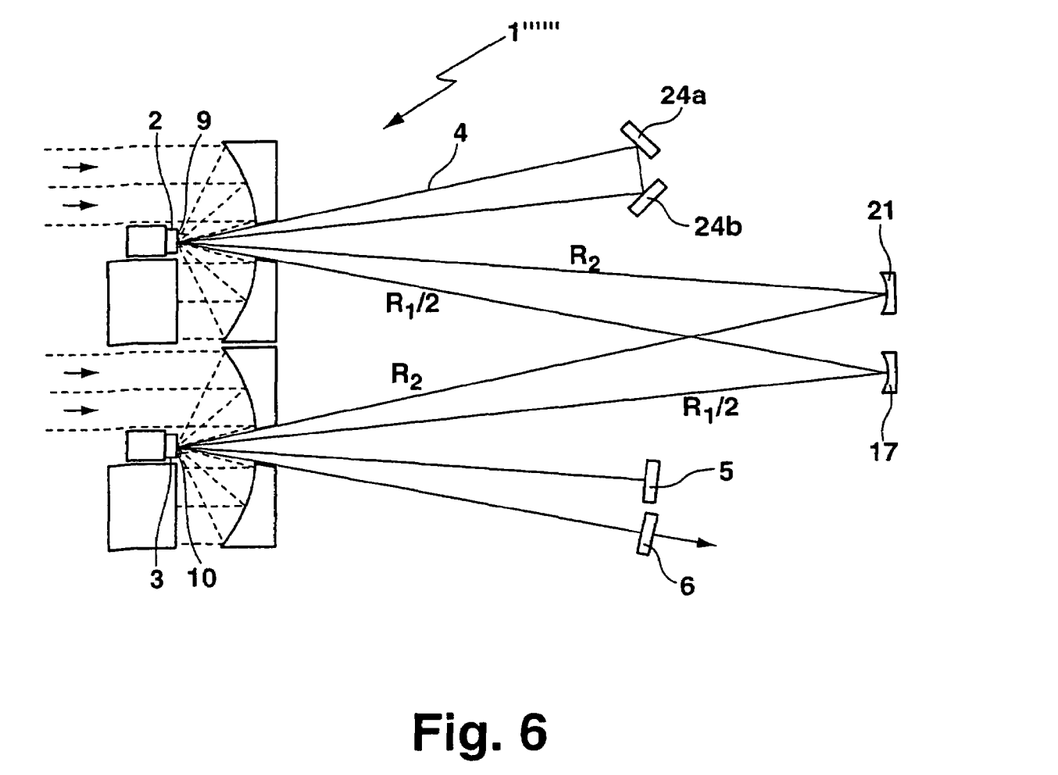
FIG. 6 is a schematic view of a sixth implementation of a laser having two disk laser crystals and spherical concave mirrors as focusing optical elements for the near-field far-field transformation and for the imaging.

Referring to FIG. 6, a laser 1'''' includes two disk laser crystals 2, 3 in the laser radiation field 4. In the laser 1'''', the surfaces of the crystals 2, 3 are imaged onto each other and are mapped onto each other by a near-field far-field transformation. The path of the laser radiation field 4 in the laser 1'''' extends from the end mirror 5 to the laser crystal 3 and from there, by way of a spherical concave mirror 17, to the laser crystal 2. After the laser crystal 2, the path extends back to the laser crystal 2 by way of two planar deflecting mirrors 24a, 24b, then extends from the laser crystal 2 to the laser crystal 3 by way of a further spherical concave mirror 21, and finally to the output mirror 6. The spherical concave mirror 17 ensures that the surface 10 of the disk laser crystal 3 and the surface 9 of the disk laser crystal 2 are mapped by a near-field far-field transformation (such as a Fourier transformation) onto one another. Towards this end, the concave mirror 17 is disposed approximately at a distance equivalent to half its radius $R_1$, from each of the disk laser crystals 2, 3. The further spherical concave mirror 21 ensures that the surfaces 9 and 10 of the disk laser crystals 2 and 3 are imaged onto each other, preferably at a scale of 1:1. Towards this end, the further concave mirror 21 is disposed approximately at a distance equivalent to its radius $R_2$, from the disk laser crystals 2, 3.

Other implementations are within the scope of the following claims.

What is claimed is:

1. A solid-state laser amplifier comprising:
    at least two laser-active media in a common laser radiation field, wherein the laser-active media form soft apertures without sharp edges that significantly cut or limit the designed beam cross-section for the laser radiation field and each of the laser-active media define a plane that is penetrated by the laser radiation field, and
    at least one focusing optical element disposed in the laser radiation field between two adjacent laser-active media, wherein a focal length and a distance of the focusing optical element from the planes of the two adjacent laser-active media are each selected such that the planes of the laser-active media are approximately mapped onto each other by a near-field far-field transformation such that the soft apertures and the transformation filter out undesired diffracted portions of the laser radiation field.

2. The laser amplifier of claim 1, wherein the plane of the laser-active media is on a side surface of the laser-active media.

3. The laser amplifier of claim 1, wherein the plane of the laser-active media is at least one of the principal planes of the laser-active media.

4. The laser amplifier of claim 1, wherein the at least one focusing optical element includes a lens with a positive focal length ($f_1$) that is disposed approximately at a distance corresponding to the focal length from the planes of two adjacent laser-active media in the laser radiation field.

5. The laser amplifier of claim 1, wherein the at least one focusing optical element includes a spherical concave mirror that is disposed in the laser radiation field approximately at a distance corresponding to half of the curvature radius of the spherical concave mirror from the planes of two adjacent laser-active media.

6. The laser amplifier of claim 1, further comprising at least one additional focusing optical element in the laser radiation field, wherein a focal length and a distance of the at least one additional focusing optical element from the planes of two adjacent laser-active media are selected in such a manner that the planes are mapped approximately onto each other.

7. The laser amplifier of claim 6, wherein the at least one additional focusing optical element includes an imaging element that maps the planes of the two adjacent laser-active media onto each other at a scale of one to one.

8. The laser amplifier of claim 6, wherein the at least one additional focusing optical element includes a lens having a positive focal length and being disposed approximately at a distance from the planes of the two adjacent laser-active media, wherein the distance corresponds to double the focal length of the lens.

9. The laser amplifier of claim 6, wherein the at least one additional focusing optical element includes a spherical concave mirror that is disposed approximately at a distance corresponding to its radius from the planes of two laser-active media.

10. The laser amplifier of claim 6, wherein the at least one additional focusing optical element includes a telescopic configuration of two concave mirrors.

11. The laser amplifier of claim 10, wherein the two concave mirrors are identical to each other.

12. The laser amplifier of claim 6, wherein the at least one additional focusing optical element includes a telescopic configuration of two lenses.

13. The laser amplifier of claim 12, wherein the two lenses are identical to each other.

14. A solid-state laser comprising:
    two mirrors defining a resonator,
    at least two laser-active media disposed in the resonator in a common laser radiation field, wherein the laser-active media form soft apertures without sharp edges that significantly cut or limit the designed beam cross-section for the laser radiation field and the laser-active media each define a plane that is penetrated by the laser radiation field, and
    at least one focusing optical element disposed in the laser radiation field between two adjacent ones of the at least two laser-active media,
    wherein a focal length and a distance of the focusing optical element from the planes of the two adjacent laser-active media are each selected such that the planes of the laser-active media are approximately mapped onto each other by a near-field far-field transformation such that the soft apertures and the transformation filter out undesired diffracted portions of the laser radiation field.

15. The solid state laser of claim 14, wherein the at least one focusing optical element includes a lens with a positive focal length ($f_1$) that is disposed approximately at a distance corresponding to the focal length from the planes of two adjacent laser-active media in the laser radiation field.

16. The solid state laser of claim 14, wherein the at least one focusing optical element includes a spherical concave mirror that is disposed in the laser radiation field approximately at a distance corresponding to half of the curvature radius of the spherical concave mirror from the planes of two adjacent laser-active media.

17. The solid state laser of claim 14, further comprising at least one additional focusing optical element in the laser radiation field, wherein a focal length and a distance of the at least one additional focusing optical element from the planes of two adjacent laser-active media are selected in such a manner that the planes are mapped approximately onto each other.

18. The solid-state laser of claim 14, wherein:
the at least two laser-active media include at least two pairs of disk laser crystals disposed in the laser radiation field,
the at least one focusing optical element includes:
   a first focusing optical element disposed in the laser radiation field between the disk laser crystals of each pair, and
   a second focusing optical element disposed in the laser radiation field between the two pairs,
the planes are surfaces of the disk laser crystals and the surfaces of each pair are each mapped onto each other by the first focusing optical element,
the second focusing optical element optically maps the surface of a disk laser crystal of one pair onto the surface of a disk laser crystal of the other pair through a near-field far-field transformation.

19. A method of forming a laser amplifier, the method comprising:

focusing pump radiation onto a first plane defined by a first laser-active medium;

focusing pump radiation onto a second plane defined by a second laser-active medium;

focusing laser radiation between the first and second planes with an optical element in a laser radiation field extending between the first and second laser-active media; and filtering out undesired diffracted portions of the laser radiation field with soft apertures formed by the first and second laser-active media by selecting a focal length of the optical element and separating the optical element from the first and second planes such that the first and second planes of the laser-active media are approximately mapped onto each other through a near-field far-field transformation.

20. The method of claim 19, further comprising imaging the first and second planes onto each other with another optical element.

* * * * *